(12) United States Patent
Gibbs et al.

(10) Patent No.: US 7,207,851 B1
(45) Date of Patent: Apr. 24, 2007

(54) AMPHIBIOUS VEHICLE

(75) Inventors: Alan Timothy Gibbs, London (GB);
Neil Graham Jenkins, Atherstone (GB)

(73) Assignee: Gibbs Technologies Ltd, Warwickshire (GB)

( * ) Notice: Subject to any disclaimer, the term of this patent is extended or adjusted under 35 U.S.C. 154(b) by 0 days.

(21) Appl. No.: 11/256,206

(22) Filed: Oct. 21, 2005

(51) Int. Cl.
*B60F 3/00* (2006.01)

(52) U.S. Cl. ............................ 440/1; 440/12.5; 440/84

(58) Field of Classification Search ............... 440/1, 440/12.5, 84, 87
See application file for complete search history.

(56) References Cited

U.S. PATENT DOCUMENTS

| | | | |
|---|---|---|---|
| 3,280,785 A | * | 10/1966 | Mycroft .................... 114/344 |
| 3,903,831 A | * | 9/1975 | Bartlett et al. ............. 114/344 |
| 4,358,072 A | * | 11/1982 | Williamson .................. 244/2 |
| 4,387,661 A | | 6/1983 | Duff |
| 4,802,433 A | | 2/1989 | Kovac |
| 5,562,066 A | | 10/1996 | Gere et al. |

FOREIGN PATENT DOCUMENTS

WO  WO 2006/084969 A2  9/2005
WO  WO 2006/084969 A3  9/2005

* cited by examiner

*Primary Examiner*—Stephen Avila
(74) *Attorney, Agent, or Firm*—Fulwider Patton LLP

(57) ABSTRACT

Amphibious vehicle needs less power on land than on water. A control system is provided to limit power and/or speed on land, using: restriction of flow of fuel, air, or exhaust gases; heated intake air; exhaust gas recirculation; declutching of a supercharger; bypassing of a turbocharger; a variable throttle stop, dual throttles, or a switchable throttle damper; cylinder or intake valve deactivation; a dual length intake manifold; dual mode ignition or engine mapping; dual fuel—gasoline on water, compressed natural gas on road; variable compression ratios or valve timing; a clutch designed to slip; automatic brake application; or aerodynamic brakes. The suspension may tilt the vehicle to increase aerodynamic resistance. The road transmission may be geared to limit maximum speed. High rolling resistance tires or twin engines may be used. A sensor on retractable suspension may indicate whether the vehicle is on land or on water.

42 Claims, 3 Drawing Sheets

AMPHIBIOUS VEHICLE

BACKGROUND OF THE INVENTION

The present invention relates to an amphibious vehicle.

The amphibious vehicle contemplated by the present invention is lightweight in nature. Nevertheless, it requires a power plant with a certain amount of power output in order that the vehicle on water can get up on to the plane and travel as a planing vehicle. Such power levels may however be capable of imparting undesirably high speed and acceleration potential to the vehicle when used on land. Moreover, legislative requirements in certain parts of the world actually restrict power and/or road speed for certain types of vehicles. For example, a Low Speed Vehicle in the USA must not be capable of exceeding 25 mph on the road while in Europe a road legal All Terrain Vehicle must be restricted to an engine power output of less than 15 kW/20 brake horsepower.

SUMMARY OF THE INVENTION

In a first aspect the present invention provides an amphibious vehicle comprising at least three wheels; handlebars operable to steer at least a front pair of the wheels; a sit-astride seat; a power plant driving at least one of the wheels when the vehicle is operating in a land mode; a jet drive or propeller driven by the power-plant when the vehicle is operating in a water mode; wherein power control means is provided to control in amount power delivered to drive the driven wheel(s), the power control means operating to limit power transmitted to the driven wheel(s) in land mode operation while allowing greater power to be transmitted to the jet drive or propeller.

In a second aspect the present invention provides an amphibious vehicle comprising: at least three wheels; handlebars operable to steer at least a front pair of the wheels; a sit-astride seat; a power plant driving at least one of the wheels when the vehicle is operating in a land mode; a jet drive or propeller driven by the power plant when the vehicle is operating in a water mode; wherein speed control means is provided to offer resistance to motion of the vehicle on land whilst not limiting speed of the vehicle over water.

In third aspect the present invention provides an amphibious vehicle comprising: at least three wheels; handlebars operable to steer at least a front pair of the wheels; a sit-astride seat; a power plant driving at least one of the wheels when the vehicle is operating in a land mode; a jet drive or propeller driven by the power plant when the vehicle is operating in a water mode; wherein the power plant outputs power via a rotating output shaft; and speed control means is provided to limit the rotational speed of the driven wheel(s) when the vehicle is operating in the land mode.

These and other features and advantages of the present invention will become apparent from the following detailed description of preferred embodiments which, taken in conjunction with the accompanying drawings, illustrate by way of example the principles of the invention.

DETAILED DESCRIPTION OF THE PREFERRED EMBODIMENTS

Figure 1:
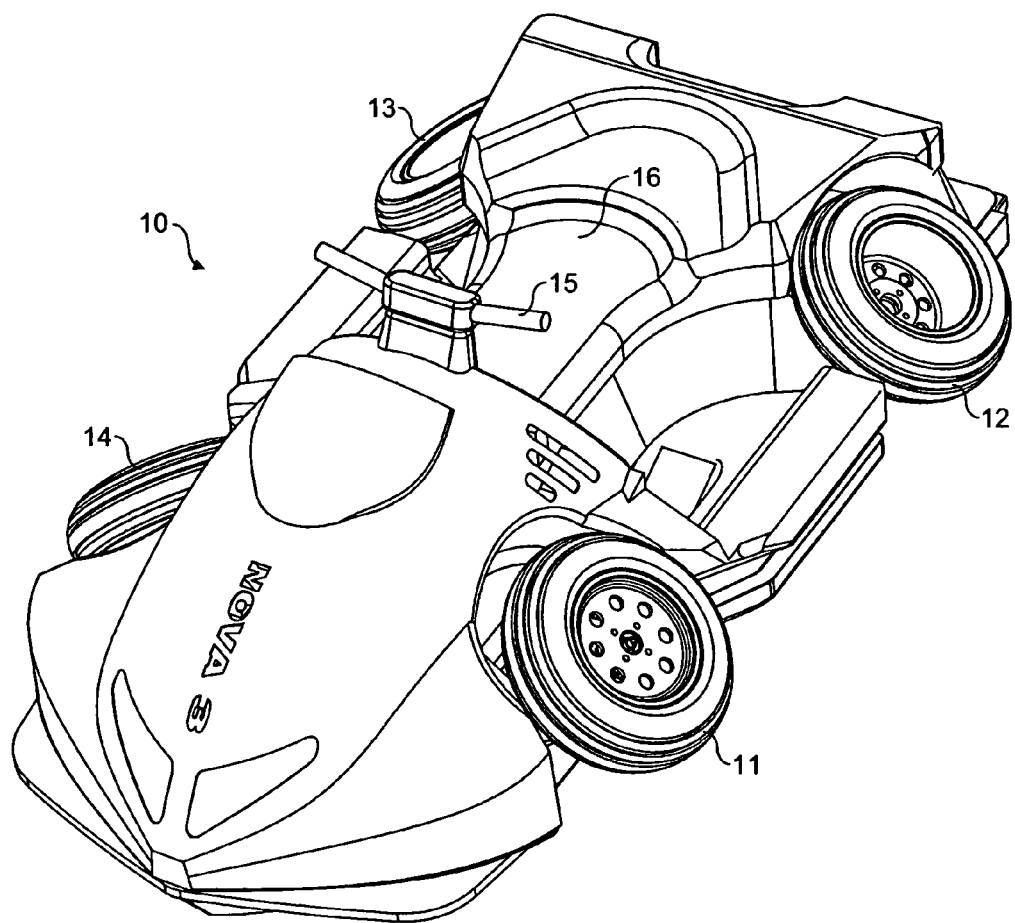
FIG. 1 is a perspective view of an amphibious vehicle according to the present invention.
Figure 2:
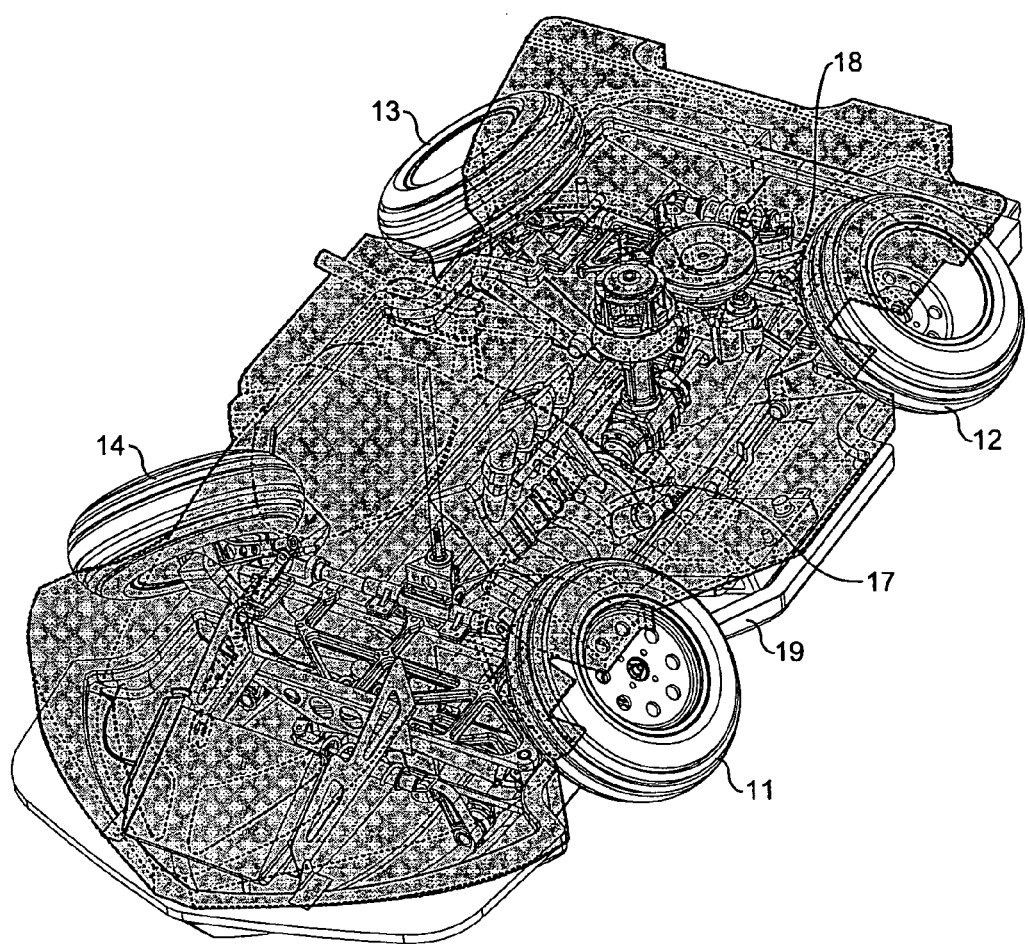
FIG. 2 is a view of the vehicle of FIG. 1 in which the top surface of the vehicle has been made transparent.

Turning firstly to FIG. 1 there can be seen in the Figure an amphibious vehicle 10 having four wheels 11, 12, 13 and 14, handlebars 15 for steering the front wheels 11 and 14 and a sit-astride seat 16. As can be seen in FIG. 2, there is located inside the vehicle a gasoline reciprocating piston multi-cylinder internal combustion engine 17 which when the vehicle is in land mode drives the two rear wheels 13 and 12 to rotate. The vehicle also has a jet drive 18 at the rear of the vehicle which is driven by the engine 17 to propel the vehicle 10 when operating in water mode.

Figure 3:
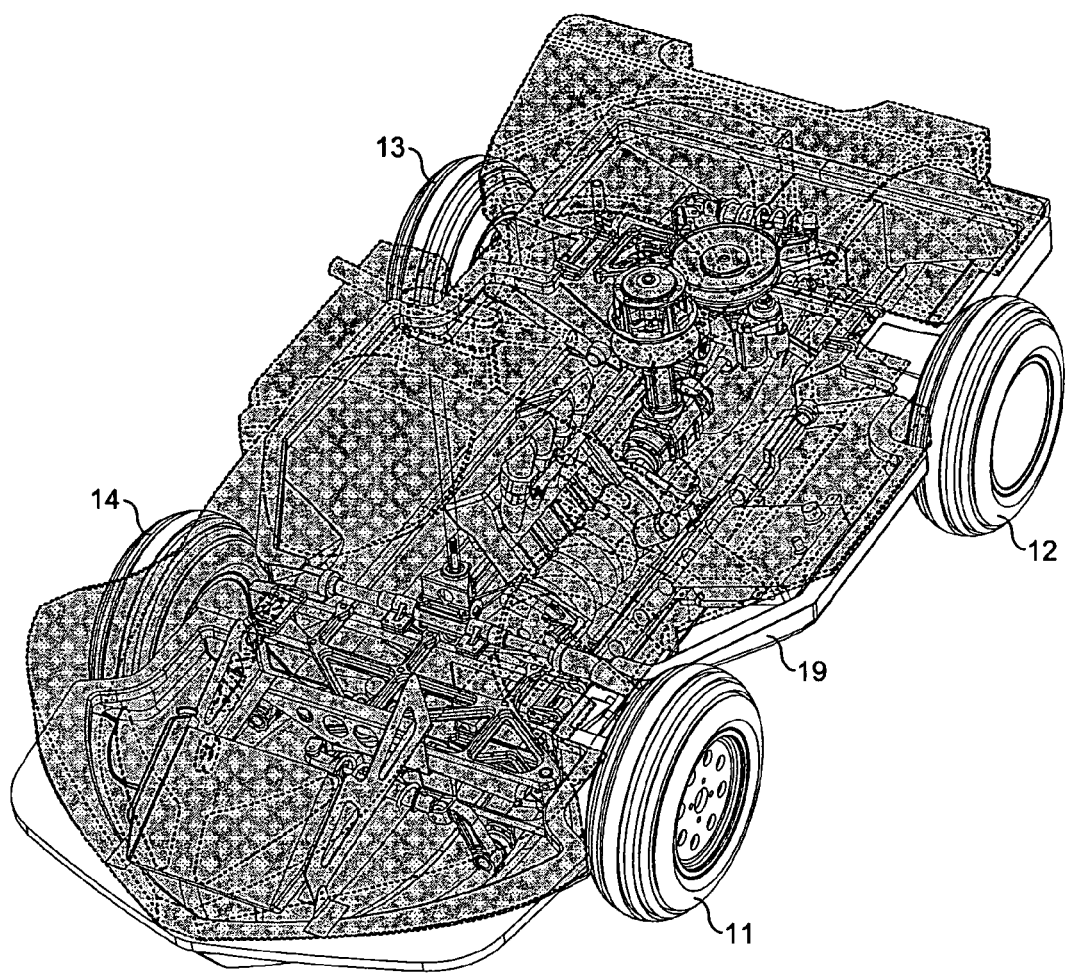
FIG. 3 corresponds to the view in FIG. 2, save that the FIG. 2 shows the vehicle in water mode and the FIG. 3 shows the vehicle in land mode.

The hull 19 of the vehicle has on its lower surface a planing surface (not shown) to enable the vehicle to plane across the water when in its water mode. To facilitate this the road wheels 11, 12, 13 and 14 are connected to the remainder of the vehicle by a suspension system which allows them to be moved between an extended position (as shown in FIG. 3) for land use and a retracted position (as shown in FIGS. 1 and 2) for use on water.

In order that the vehicle 10 operates as a planing vehicle on water, even when transporting 2 or 3 passengers, the engine 17 must have a certain power output. However, since the vehicle 10 will be very light, this power output if fully available on land would make the vehicle difficult to drive because it would be capable on land of excessive speed and excessive acceleration.

The present invention provides for the restriction of the power available to the road wheels and/or restriction of the speed of rotation of the road wheels by a power or speed control system which limits the power available to drive the wheels in road use or the rotational speed of the wheels, whilst allowing greater power to be available to the jet drive or propeller in marine use and/or allowing the jet drive/propeller to rotate at greater rotational speed than the road wheels. The power control system can take many forms, including:

1. Provision of a fuelling system for the engine 17 which operates to restrict the flow of fuel to the engine when the vehicle is operating in road mode. For an engine with a carburetor this would be done by metering the fuel supplied from a fuel pump and for a fuel injection engine the fuel supply pressure could be varied. For a diesel engine the mechanical governor could be restricted in land mode.

2. Provision of an exhaust throttle or brake which restricts flow of combusted gases from the combustion chambers of the engine 17 during road mode operation.

3. The use of an intake throttle whose limit of opening can be controlled so that in marine mode the intake throttle will be capable of opening to wide open throttle, but in land mode the movement of the throttle will be restricted to an extreme position which is still partly closed. This can be done by deploying a mechanical throttle stop to limit throttle movement in land mode and retracting the stop for marine use. Alternatively the throttle could be an electrically operated throttle controlled by an electronic control system which receives a signal indicative of position of a manually operable throttle control and controls position of the throttle accordingly; in land mode operation the system will limit throttle motion to restrict engine output power and thereby vehicle speed. A mechanical throttle damper could also be employed operable only in land mode to damp throttle movement (or with different characteristics in land and marine modes, with a greater degree of damping applied in land mode).

4. If the engine 17 is a multi-cylinder engine then it is envisaged that the engine could be provided with a cylinder deactivation system so that all of the cylinders would be active when the vehicle is operating in water mode and then some of the cylinders deactivated for land mode. If the engine is a spark ignition engine which uses port fuel injectors, one for each cylinder, then this could be achieved by deactivating the ignition system for the relevant cylinders and deactivating the port fuel injectors for the relevant cylinders.

5. The engine 17 could be provided with an electronic ignition system (assuming it is a spark ignition engine), and the timing of the spark could be varied to alter the power output of the engine between marine mode operation and land mode operation.

6. The engine 17 could be connected to the wheels 12 via a gearbox which is deliberately chosen to be a low ratio gear box so that the rotational speed of the wheels 12 and 13 is limited by the maximum speed of revolution of the engine 17. The transmission could comprise a simple manual gearbox, an automatic gearbox or a continuously variable gearbox, all suitably configured to ensure that a gear ratio is never employed which at maximum engine speed would result in excessive land speed of the vehicle.

7. The engine 17 could be adapted to be a "dual fuel" engine, for instance operating using gasoline on water and using compressed natural gas (which has a lower calorific value) in land mode.

8. The engine 17 could be a supercharged engine with an engine driven compressor. The supercharger could be driven by a clutch and the clutch closed during marine mode (so that the engine is supercharged) and opened during land mode so that the engine loses its supercharging and therefore loses power.

9. The engine 17 could be a turbocharged engine. If so, a bypass passage could be included to bypass the turbocharger so that the engine is turbocharged only during marine operation and not during land use. Additionally, or alternatively the vanes in the turbocharger could be made to have a variable pitch, in which case the pitch would be varied to decrease boost in land mode and increase boost in marine mode. Additionally, or alternatively the engine could be provided with a pair of turbochargers, high pressure and low pressure, and the low pressure turbocharger used on its own in land mode could then be replaced by the high pressure turbocharger in water mode (or both turbochargers operated simultaneously in water mode).

10. The engine 17 could be provided with multiple poppet valves per cylinder, including at least two inlet poppet valves per cylinder. A poppet valve deactivation system could then be operated to deactivate e.g. one or each pair of inlet poppet valves, in order to decrease the flow of air through the engine in land mode.

11. The air inlet manifold for the engine 17 could be made of variable length and could be "tuned" to give good performance during marine mode operation (by ensuring that a standing wave is set up in the inlet manifold which gives rise to high pressure just behind the inlet poppet valves). The inlet manifold could then be "detuned" for land use to reduce the engine performance and output.

12. By suitable programming of an engine control unit it will be possible to give an engine characteristics for water mode operation which are different to the characteristics for land mode operation. For instance, the engine control unit can vary the fuelling (as described above) and the spark ignition timing (also described above). The engine control unit could be provide with a pair of different throttle maps, one for land use and the other for marine use.

13. Certain internal combustion engines have been proposed which achieve variable compression ratios in the cylinders of the engine. SAAB has an engine with a tilting cylinder block which enables compression ratio to be varied. Others have proposed variable length pistons or movable cylinder heads. Crank mechanisms have also been proposed in the past which vary the piston travel. Any of these mechanisms could be used to alter the power output from the engine so that the power output is greater in marine mode than in land mode.

14. It is known in several engines available today to vary in timing the opening and closing of inlet and exhaust valves of the engine. This can be achieved, for instance, using cam phasing mechanisms. Varying the valve timing can lead to a change in the characteristics of the engine and a power output in land mode which is less than the power output in marine mode.

15. For a simpler and somewhat cruder approach, the power control mechanism could act on the clutch which connects the engine to the driven road wheels. The clutch mechanism could be controlled to deliberately allow clutch slippage and therefore limit the power transmitted to the road wheels, even though the engine itself outputs the same amount of power both in land and water modes.

16. Another simple approach to limiting power output would be to warm the intake air prior to combustion, which could be done, for instance, by running hot coolant around the air intake with the flow of hot coolant switched on and off depending upon operating mode.

17. The body of the vehicle could be provided with moving flaps which are retracted during marine mode operation to make the vehicle more streamlined and then extended during land mode operation to give greater air resistance and restrict thereby the speed of the vehicle. The movable body parts of the vehicle could be a front screen of the vehicle, which could be tilted into a more upright position in land mode, or a spoiler. Also the air intake apertures in the vehicle body (which provide a flow of cooling air to the radiator(s) of the vehicle) could be provided in deployable scoops which are extended in land mode operation of the vehicle to increase air flow and to increase drag. The vehicle suspension could also be provided with a tilting mechanism which would tilt the vehicle with increasing speed in order that the vehicle presents a greater effective frontal area to increase drag.

18. It would be possible to fit the vehicle with a sophisticated braking system which would apply brakes to the road wheels to limit the top speed of the vehicle. This could be a function of a traction control system of the vehicle.

19. The engine could be provided with an alternator or other electrical charger which is switched in to be driven by the engine during land mode, but which is decoupled from the engine during marine mode so that the net power of the engine is reduced in land mode because of the power needed to power the electrical charger.

20. A very basic way of restricting the performance of the vehicle on land is to provide it with tyres which have high rolling resistance and high friction.

21. It is also possible to configure the vehicle with a first throttle control for road use and a second throttle control for marine use, with each throttle control being made automatically inactive depending upon the mode of operation. The road use throttle control would only allow the throttle to be opened part way and not a wide open throttle thereby restricting the power output during land operation. On the other hand, the marine mode operation would allow the vehicle to operate with wide open throttle and would not restrict the power output of the engine.

22. Many internal combustion engines are now provided with exhaust gas recirculation in order to improve the overall emissions of the engine. It would be possible to adapt an exhaust gas recirculation system to feed back sufficient exhaust gas into the combustion chambers that the overall power output of the engine was reduced. This would be done for land operation, whereas the exhaust gas recirculation would be reduced or stopped completely for water use.

23. Whilst in the drawings and as described above, the vehicle has a single internal combustion engine as its power plant, the vehicle could be provided with, for instance, two internal combustion engines. The transmission connecting the internal combustion engines to the jet drive/propeller and to the driven road wheels would operate under the control of the power control system in order to either power the jet drive/propeller using both engines, with the driven road wheels driven by only one engine, or alternatively to drive the jet drive/propeller with a first engine and the driven road wheels with a second, different engine. The second engine would have a reduced power output as compared with the first engine.

In the modes of operation described above, in which an absolute limit is placed on vehicle speed it may be desired to provide a warning light in the instrument cluster to warn the driver when the speed limit is reached.

For all of the embodiments described above there will be an electronic control system which senses whether the vehicle is in road mode operation or marine mode operation and then controls the power output of the engine accordingly. The simplest way of providing for this would be to sense whether the wheels are in their retracted or extended positions. The wheels will typically be extended or retracted under manual control and a sensor can easily be provided to detect which location they are in. The switch-over of engine power output or the switch of power available to the vehicle wheels will occur automatically on the sensing of a change of mode from water mode to land mode. The driver will not be allowed to override the action of the power control system.

Whilst sensing the position of the wheels will give the easiest way of detecting whether the vehicle is in land mode or water mode, other ways of detecting this are possible: for instances, sensors to detect the immersion of the hull in water, e.g. hull-mounted pressure sensors, or sensors detecting the presence of water in the intake pipe leading to a jet drive.

While a particular form of the present invention has been illustrated and described, it will also be apparent to those skilled in the art that various modifications can be made without departing from the spirit and the scope of the present invention. Accordingly, it is not intended that the invention be limited except by the appended claims.

What is claimed is:

1. An amphibious vehicle comprising:
at least three wheels;
handlebars operable to steer at least a front pair of the wheels;
a sit-astride seat;
a power plant driving at least one of the wheels when the vehicle is operating in a land mode;
a jet drive or propeller driven by the power plant when the vehicle is operating in a water mode; wherein:
power control means is provided to control in amount power delivered to drive the driven wheel(s), the power control means operating to limit power transmitted to the driven wheel(s) in land mode operation, while allowing greater power to be transmitted to the jet drive or propeller.

2. An amphibious vehicle as claimed in claim 1, wherein the power control means places no restriction on power transmitted to the jet drive or propeller.

3. An amphibious vehicle as claimed in claim 1, wherein the wheels are connected to the remainder of the vehicle by a suspension system which is operable to move the wheels between an extended position for land mode operation and a retracted position for water mode operation and wherein the power control means has sensor means sensing whether the wheels are extended or retracted and the power control means controls the power transmitted accordingly.

4. An amphibious vehicle as claimed in claim 1, wherein the powerplant comprises a plurality of independent engines and transmission means is provided to relay power from the engines to the jet drive/propeller and the drive road wheel(s), wherein:
the power control means controls the transmission means so that: either one engine is used to drive the jet drive or the propeller in water mode and a different engine used to drive the driven wheel(s) in land mode; or a plurality of engines are used to drive the jet drive or the propeller in water mode and a lesser number of the engines are used to drive the driven wheel(s) in land mode.

5. An amphibious vehicle as claimed in claim 1, wherein the power control means controls a fuelling system supplying fuel to the powerplant, the control means restricting the amount of fuel fed to the powerplant during land mode operation.

6. An amphibious vehicle as claimed in claim 5, wherein the power plant is an internal combustion engine with a carburetor supplied with fuel pumped by a fuel pump and wherein the power control means meters the fuel supplied by the pump to reduce the rate of flow of fuel to the carburetor during land mode operation.

7. An amphibious vehicle as claimed in claim 5, wherein the power plant is an internal combustion engine supplied by fuel pumped by a fuel pump and wherein the power control means reduces fuel supply pressure for land mode operation.

8. An amphibious vehicle as claimed in claim 5, wherein the power plant is a diesel engine with a governor regulating the maximum speed of the engine in land mode operation.

9. An amphibious vehicle as claimed in claim 1, wherein the power plant is an internal combustion engine with a throttle valve which throttles flow of air to the engine and the power control means restricts opening of the throttle valve during land mode operation of the vehicle to thereby restrict power output of the engine.

10. An amphibious vehicle as claimed in claim 9, wherein the power control means comprises a mechanical throttle stop which is deployed in land mode operation to limit throttle motion and which stop is retracted in water mode operation.

11. An amphibious vehicle as claimed in claim 9, wherein the throttle is electrically operated and controlled by an electronic control system which senses operation of a manually operable throttle control and controls position of the throttle accordingly, the power control means being incorporated in the electronic throttle control system and operating to allow a full range of throttle motion in water mode operation and a reduced range of throttle motion in land mode operation.

12. An amphibious vehicle as claimed in claim 1, wherein the power plant is an internal combustion engine with a plurality of cylinders and the power control means comprises cylinder deactivation means which deactivates at least one cylinder during land mode operation.

13. An amphibious vehicle as claimed in claim 12, wherein the internal combustion engine is a spark ignition engine and the cylinder deactivation means deactivates the ignition system(s) of the deactivated cylinder(s).

14. An amphibious vehicle as claimed in claim 12, wherein the internal combustion engine is a port fuelled engine with a fuel injector for each cylinder and wherein the power control means deactivates the fuel injector(s) for the deactivated cylinders.

15. An amphibious vehicle as claimed in claim 1, wherein power control means controls supply of fuel to the power plant so that the power plant is supplied with a first fuel during land mode operation and a second different fuel in water mode operation, the power plant producing more power when operating using the second fuel than when using the first fuel.

16. An amphibious vehicle as claimed in claim 1, wherein the power plant is a supercharged internal combustion engine with an engine driven compressor driven via a clutch, the power control means controlling operation of the clutch and connecting the supercharger to be driven by the engine in water mode operation and disconnecting the supercharger from the engine to render the supercharger inoperative during land mode operation.

17. An amphibious vehicle as claimed in claim 1, wherein the power plant is a turbo-charged internal combustion engine with a turbo-charger system which is controllable to provide varying degrees of inlet air pressure boost, the power control means controlling the boost supplied so that a greater degree of boost is provided in water mode operation and a lesser degree of boost in land mode operation.

18. An amphibious vehicle as claimed in claim 17, wherein the turbo-charging system has a turbo-charger with adjustable vanes, the angle of which is adjusted by the power control means to vary boost.

19. An amphibious vehicle as claimed in claim 17, wherein a the turbo-charging system comprises a turbo-charger and at least one bypass passage through which air and exhaust gases can bypass the turbo-charger, the power control means controlling the amount of air passing through the bypass passage to thereby control boost.

20. An amphibious vehicle as claimed in claim 1, wherein the power plant is an internal combustion engine with at least one cylinder supplied with air via a pair of inlet ports and the power control means comprises air flow control means which allows flow of air through both inlet ports in water mode operation and through only one of the inlet ports during land mode operation.

21. An amphibious vehicle as claimed in claim 20, wherein the air flow control means comprises a pair of cam driven poppet valves, one for each inlet port, and a valve deactivation mechanism for deactivating one of them.

22. An amphibious vehicle as claimed in claim 1, wherein the power plant comprises an internal combustion engine supplied with air via a variable length intake manifold and the power control means controls the length of the intake manifold so as to optimise engine performance in water mode operation, while controlling the length of the intake manifold to reduce engine performance during land mode operation.

23. An amphibious vehicle as claimed in claim 1, wherein the power plant is an internal combustion engine with an electronic engine management controller and the power control means is incorporated into the engine management controller and controls the engine to operate with a first power output during water mode operation and a second lower power output during land mode operation.

24. An amphibious vehicle as claimed in claim 23, wherein the engine management controller is programmed with two different throttle maps, one for water mode operation and the other for land mode operation.

25. An amphibious vehicle as claimed in claim 1, wherein the power plant is a reciprocating piston internal combustion engine and the power control means comprises a mechanism for varying a compression ratio of the engine, the power control selecting a first compression ratio for water mode operation and a second lower compression ratio for land mode operation.

26. An amphibious vehicle as claimed in claim 25, wherein the mechanism for varying the compression ratio comprises a mechanism for varying piston displacement.

27. An amphibious vehicle as claimed in claim 2, wherein the power plant is an internal combustion engine having at least one inlet valve and at least one outlet valve controlling flow of gases into and out of a combustion chamber, and a valve operating mechanism for operating the valves, wherein the power controls means uses the valve operating mechanism to vary the timing of opening and closing of the valves between water and land modes of operation.

28. An amphibious vehicle as claimed in claim 1, wherein the power plant is connected to the driven wheel(s) via a clutch and the power control means comprises a clutch control mechanism which during land mode operation of the vehicle introduces clutch slippage to limit speed of rotation of the driven wheel(s).

29. An amphibious vehicle as claimed in claim 1, wherein the power plant is an internal combustion engine and the power control means comprises heating means for heating air supplied to the engine which operates in land mode operation of the vehicle only.

30. An amphibious vehicle as claimed in claim 1, wherein the power control means comprises an electrical power generator which can be driven by the power plant to generate electrical power and the power control means in water mode operation controls operation of the generator so that it takes no power or a first level of power from the power plant and the power control means in land mode operation controls operation of the generator so that it takes power from the power plant at a second level higher than the first level.

31. An amphibious vehicle as claimed in claim 1, wherein the vehicle is provided with first and second manually operable throttle controls which operate independently of each other and the power control means renders the first throttle control inoperative during water mode operation and the second throttle control inoperative during land mode operation, the first throttle control allowing a smaller range of throttle movement than the second throttle control.

32. An amphibious vehicle as claimed in claim 1, wherein the power plant is an internal combustion engine which has an exhaust gas recirculation system and the power control means control in amount the exhaust gas recirculation, the power control means increasing the amount of recirculation in the land mode operation to reduce the power output of the engine and reducing the amount of exhaust gas in water mode operation to increase power output of the engine.

33. An amphibious vehicle comprising:
at least three wheels;
handlebars operable to steer at least a front pair of the wheels;
a sit-astride seat;
a power plant driving at least one of the wheels when the vehicle is operating in a land mode;
a jet drive or propeller driven by the power plant when the vehicle is operating in a water mode; wherein
speed control means is provided to offer resistance to motion of the vehicle on land whilst not limiting speed of the vehicle over water.

34. An amphibious vehicle as claimed in claim 33, wherein the speed control means comprises body panels which are deployable to offer resistance to motion through air and which are deployed by the speed control means for land mode operation of the vehicle and which body panels are retracted for water mode operation.

35. An amphibious vehicle as claimed in claim 34, wherein the body panels include cooling ducts.

36. An amphibious vehicle as claimed in claim 34, wherein the body panels include a front screen.

37. An amphibious vehicle as claimed in claim 33, wherein the speed control means comprises a vehicle tilting mechanism which tilts the vehicle during land mode operation to increase effective frontal area of the vehicle.

38. An amphibious vehicle as claimed in claim 33, wherein the speed control means comprises tyres which offer a resistance to rotation greater than conventional tyres.

39. An amphibious vehicle comprising:
at least three wheels;
handlebars operable to steer at least a front pair of the wheels;
a sit-astride seat;
a power plant driving at least one of the wheels when the vehicle is operating in a land mode;
a jet drive or propeller driven by the power plant when the vehicle is operating in a water mode; wherein
the power plant outputs power via a rotating output shaft; and
speed control means is provided to limit the rotational speed of the driven wheel(s) when the vehicle is operating in the land mode.

40. An amphibious vehicle as claimed in claim 39, wherein a transmission relays drive from the power plant to the driven wheel(s) and the speed control means comprises a gearbox with gear ratios which ensure that the speed of rotation of the driven wheel(s) is always less than the speed of rotation of the rotating output shaft of the power plant.

41. An amphibious vehicle as claimed in claim 39, comprising a road wheel braking system wherein the speed control means controls the braking system to apply a braking force when the rotational speed of the road wheels reaches a preset limit.

42. An amphibious vehicle as claimed in claim 39, wherein the vehicle is provided with a warning device for warning a driver of the vehicle when a preset speed limit is reached.

* * * * *